(12) United States Patent
Cidon et al.

(10) Patent No.: US 7,835,293 B2
(45) Date of Patent: Nov. 16, 2010

(54) QUALITY OF SERVICE TESTING OF COMMUNICATIONS NETWORKS

(75) Inventors: Israel Cidon, Haifa (IL); Lior Horn, Yoqneam Illit (IL); Moshe Sidi, Haifa (IL); Benny Zangiri, Zichron Yaakov (IL)

(73) Assignee: Cisco Technology, Inc., San Jose, CA (US)

(*) Notice: Subject to any disclaimer, the term of this patent is extended or adjusted under 35 U.S.C. 154(b) by 749 days.

(21) Appl. No.: 11/225,713

(22) Filed: Sep. 13, 2005

(65) Prior Publication Data

US 2007/0076605 A1   Apr. 5, 2007

(51) Int. Cl.
*G11B 19/22* (2006.01)

(52) U.S. Cl. .................... 370/248; 709/224

(58) Field of Classification Search ........... 370/238, 370/226, 352, 252, 241, 235, 230, 249, 395.21, 370/248; 709/224, 227
See application file for complete search history.

(56) References Cited

U.S. PATENT DOCUMENTS

| | | | |
|---|---|---|---|
| 5,477,531 A * | 12/1995 | McKee et al. | 370/249 |
| 5,648,965 A | 7/1997 | Thadani et al. | |
| 5,678,002 A | 10/1997 | Fawcett et al. | |
| 5,812,529 A | 9/1998 | Czarnick et al. | |
| 5,838,919 A | 11/1998 | Schwaller et al. | |
| 5,881,237 A | 3/1999 | Schwaller et al. | |
| 5,958,010 A | 9/1999 | Agarwal et al. | |
| 6,006,268 A | 12/1999 | Coile et al. | |
| 6,029,258 A | 2/2000 | Ahmad | |
| 6,115,751 A | 9/2000 | Tam et al. | |
| 6,269,330 B1 | 7/2001 | Cidon et al. | |
| 6,327,620 B1 | 12/2001 | Tams et al. | |
| 6,360,268 B1 * | 3/2002 | Silva et al. | 709/227 |
| 6,363,053 B1 * | 3/2002 | Schuster et al. | 370/230 |
| 6,385,204 B1 | 5/2002 | Hoefelmeyen et al. | |
| 6,397,359 B1 | 5/2002 | Chandra et al. | |

(Continued)

FOREIGN PATENT DOCUMENTS

WO   WO 01/82022   11/2001

(Continued)

OTHER PUBLICATIONS

Hernandez, "Gigabit Ethernet Auto-Negotiation", Dell™ Power Solutions (Issue 1, 2001), pp. 117-122.

(Continued)

*Primary Examiner*—Aung S Moe
*Assistant Examiner*—Awet Haile
(74) *Attorney, Agent, or Firm*—Weingarten, Schurgin, Gagnebin & Lebovici LLP

(57) ABSTRACT

Network testing is conducted using a pair of traffic agents that acts as sender and receiver endpoints. The sending traffic agent generates and transmits a stream of packet batches, each batch being composed of high and low priority packets in a predetermined sending order. The receiving traffic agent analyzes the order of packet arrival in the stream relative to the sending order, and returns results to a traffic control module. Path speed and the priority classification of the traffic are parameters used to configure the tests. The tests are typically run periodically under different load conditions in order to evaluate the effects of other traffic being concurrently transiting the network.

19 Claims, 4 Drawing Sheets

U.S. PATENT DOCUMENTS

| | | | |
|---|---|---|---|
| 6,438,711 B2 | 8/2002 | Woodruff | 714/27 |
| 6,467,041 B1 | 10/2002 | Blam | 713/310 |
| 6,618,389 B2 | 9/2003 | Hoefelmeyen et al. | |
| 6,622,157 B1 | 9/2003 | Heddaya et al. | |
| 6,665,820 B1 | 12/2003 | Frowein et al. | 714/43 |
| 6,697,962 B1 | 2/2004 | McCrory et al. | 714/27 |
| 6,700,891 B1 | 3/2004 | Wong | |
| 6,711,137 B1* | 3/2004 | Klassen et al. | 370/252 |
| 6,834,099 B1* | 12/2004 | Cowden et al. | 379/29.01 |
| 6,845,394 B2 | 1/2005 | Ritche | 709/221 |
| 6,865,691 B1 | 3/2005 | Brundridge et al. | |
| 6,883,118 B2 | 4/2005 | Morgan et al. | 714/43 |
| 6,885,641 B1* | 4/2005 | Chan et al. | 370/252 |
| 6,958,977 B1 | 10/2005 | Mitrani et al. | |
| 6,990,616 B1 | 1/2006 | Botton Dascal et al. | |
| 7,397,801 B2* | 7/2008 | Zuberi et al. | 370/395.21 |
| 7,496,661 B1* | 2/2009 | Morford et al. | 709/224 |
| 2001/0012272 A1* | 8/2001 | Aubert et al. | 370/230 |
| 2002/0133575 A1 | 9/2002 | Cidon et al. | |
| 2002/0144187 A1 | 10/2002 | Morgan et al. | 714/43 |
| 2003/0107991 A1* | 6/2003 | Tezuka et al. | 370/229 |
| 2005/0073961 A1* | 4/2005 | Paik et al. | 370/252 |
| 2006/0190594 A1* | 8/2006 | Jorgenson et al. | 709/224 |
| 2008/0040718 A1* | 2/2008 | Cloonan et al. | 718/102 |

FOREIGN PATENT DOCUMENTS

WO    WO 01/95053    12/2001

OTHER PUBLICATIONS http://www.ethermanage.com/ethernet/autoneg.html, 2005.
http://www.cites.uiuc.edu/network/autosense.html 2005.
http://www.scyld.com/Nway.html 2005.

* cited by examiner

QUALITY OF SERVICE TESTING OF COMMUNICATIONS NETWORKS

BACKGROUND OF THE INVENTION

1. Field of the Invention

This invention relates to digital communication networks. More particularly, this invention relates to testing and discovery of configuration faults in communication networks.

2. Description of the Related Art

The meanings of some acronyms and terminology used herein are given in Table 1.

TABLE 1

| | |
|---|---|
| ASP | Application Service Provider |
| ATF | Active Testing Framework |
| CQ | Custom Queueing. A queueing discipline. |
| DHCP | Dynamic Host Configuration Protocol |
| DiffServ | IETF Differentiated Services |
| DMZ | Demilitarized zone. A DMZ network is a second network behind a firewall. |
| DNS | Domain Name System |
| DSCP | Differentiated Services Code Point. Classification of packets into traffic classes that receive specified behavior in a switch or router. |
| DSL | Digital Subscriber Line |
| FIFO | First-In, First-Out. A queueing discipline. |
| GPS | Global Performance Services |
| ICMP | Internet Control Message Protocol |
| IETF | Internet Engineering Task Force |
| IP | Internet Protocol |
| ISDN | Integrated Services Digital Network |
| ISP | Internet Service Provider |
| LLQ | Low Latency Queueing |
| MOS | Mean Opinion Score |
| MSP | Management Service Provider |
| NAP | Network Access Point |
| NIC | Network Interface Card |
| PBX | Private Branch eXchange |
| Pcap | Packet Capture |
| QoS | Quality of Service |
| RMON | Remote Monitoring |
| RTP | Realtime Protocol. An IETF standard designed for the end-to-end transport of multimedia data. |
| SNMP | Simplified Network Management Protocol |
| TA | Traffic Agent |
| TCP | Transmission Control Protocol |
| TFTP | Trivial File Transfer Protocol |
| TTL | Time To Live |
| UDP | User Datagram Protocol |
| VcoIP | Video-conference-over-Internet Protocol |
| VoIP | Voice-over-Internet Protocol |
| WAN | Wide Area Network |
| WFQ | Weighted Fair Queueing. A queueing discipline. |

Deployment of a Voice-over-IP (VOIP) telephony system on an IP network can enhance telephone service at a fraction of the cost of a traditional PBX. Before reaping the benefits of VOIP and other emerging realtime applications such as Video-Conference-over-IP (VCoIP), it is necessary to ascertain that the network has sufficient bandwidth to deliver high quality realtime traffic without adversely affecting other data services. In particular, it is desirable to know how many voice calls a network can safely support.

Only a small minority of present-day corporate networks are actually capable of handling realtime traffic such as VoIP without modification. Moreover, converged IP networks are likely to be inadequate whenever a new realtime service is added. This makes pre-deployment testing of the network an absolute necessity.

Assuring continued success of VoIP and other realtime services requires that network testing be repeated in a continuous systematic manner. It is important to assess the impact of the various types of changes in the network traffic loads, topology and functions that inevitably occur over time. The addition of new applications, the extension of the network to new locations, and the inexorable increase in network utilization can all potentially impact VOIP and other realtime applications quality.

A good network and an application monitoring program that operates repeatedly over the life cycle of a network provides diagnostics that are sufficiently granular to pinpoint the exact nature and location of problems that can jeopardize data transport quality on the network. For example, in the converged network environment the network gear needs to be configured to a proper Quality of Service (QoS) setting that allocates the network resources among multiple applications. A QoS setting that allocates too few resources for Realtime Protocol (RTP) packets will undermine VOIP communications, even when the overall VoIP traffic load on the network is adequate. Overly simplistic network performance reports would not reveal the root cause of such a problem. A competent testing program is capable of detecting and identifying such problems, determining if corrective actions have achieved a solution, and identifying any new problems or undesirable side effects that may have been created.

The need for iterative testing is further emphasized by the reality that first attempts to solve many network problems are typically only partially effective. This sets up a requirement for a further round of testing in order to evaluate incremental attempts at solution. A tool used for this kind of iterative, analytic testing must clearly be capable of providing granular diagnostics about specific network links or a set of targeted end-to-end realtime sessions.

Another aspect of network testing involves assurance that business applications and services other than VOIP service remain unimpaired as the network is optimized for good voice quality. Various applications running on an IP network all impact each other. Thus, effective QoS testing must take into account the full range of services operating across the enterprise.

Network monitoring tools have been attempted to be used for evaluation of VoIP quality. However, such tools are directed to describing traffic conditions on the network generally. Thus, they lack the facility to diagnose incipient realtime service degradation and the underlying causes of that degradation.

Various methods are known in the art for testing network performance and localizing problems in the network. For example, U.S. Pat. No. 5,812,529, whose disclosure is incorporated herein by reference, describes a system and method for acquiring network performance data, built around a "mission server", which interfaces with clients to receive requests for missions. A typical mission includes operations such as transmission and reception of data packets among devices connected to segments of the network. The mission is performed or supported by "sentries," typically software agents running on stand-alone network devices or endpoints. The sentries carry out mission operations in response to commands from the mission server, and report to the mission server on the mission results.

U.S. Pat. Nos. 5,838,919 and 5,881,237, whose disclosures are incorporated herein by reference, describe methods, systems and computer program products for testing of network performance using test scenarios that simulate actual communications traffic between network endpoints. Specific test protocols are assigned to endpoint nodes on the network. Typically, the nodes are paired, and one of the nodes in the pair communicates the protocol to the other, associated node.

A console node sets up the test protocols, initiates their execution and receives data on the test performance from the endpoint nodes.

U.S. Pat. No. 6,269,330, whose disclosure is incorporated herein by reference, describes a method and apparatus for testing a network having a plurality of nodes. The method includes sending commands to one or more traffic agents connected to the network and to at least one network management agent coupled to a respective node of the network, transmitting data from at least one of the traffic agents over the network responsive to the commands, determining network information at the at least one network management agent responsive to the commands and to transmission of the data through the respective node, and receiving and evaluating the network information to assess a state of the network.

Aspects of the methods described in U.S. Pat. No. 6,269,330 are embodied in an Active Testing Framework (ATF) known as NetAlly®, available from Viola Networks, of Yokneam, Israel. NetAlly integrates the following components:

Test Center—orchestrates all NetAlly components to render network tests at scheduled or event-triggered times, or interactively. In addition, it generates reports and triggers alerts when faults are detected.

Test Directory—contains a set of predefined tests that can be parameterized manually or automatically.

Traffic Agents—located at network junctions and endpoints. Traffic agents are controlled by the test center and can inject traffic that follows specific patterns into the network, simultaneously intercept traffic from the network and other traffic agents, and then report to the test center. Traffic agents can be installed as software agents on workstations or servers. They can also take the form of dedicated hardware probes, or can be built into network communication equipment.

NetAlly includes unique Web browser-based traffic agents, called NetRegard™ agents. Identical in functionality to NetAlly's standard traffic agent, these virtual devices can be deployed by simply clicking a link in a standard Web browser. Thus, true end-to-end network path testing can be quickly and easily accomplished to any end user desktop on the network without any software or hardware installation whatsoever. NetRegard agents also make it possible to perform ad hoc testing anywhere on the network without the need to send technicians to remote locations; any end user can be asked to enter a URL in his browser and may leave the browser open for as long as testing needs to continue.

NetAlly leverages existing network management technology, including SNMP, RMON and telnet-based device access, to obtain monitored network data and for configuration of active testing.

NetAlly includes a server-based software component called NetAlly Proxy that is able to traverse firewalls. While maintaining complete network security, NetAlly Proxy allows the NetAlly test center to communicate with traffic agents, Web-based NetRegard agents, and SNMP-equipped devices located beyond firewalls, whether within a DMZ, an extranet, or the global Internet.

Traffic agents are disclosed in further detail in commonly assigned U.S. Patent Application Publication No. 20020133575, the disclosure of which is herein incorporated by reference.

The ATF test directory includes tests that can be used for various forms of network testing and diagnosis. Some of these tests emulate different types and classes of traffic between users or between users and application servers. Such tests measure the network performance in terms of loss, jitter, throughput, round trip delay, out-of-order packets or other factors. Some tests use standard network management interfaces, such as RMON, to read applicable attributes from network equipment and to conduct realtime correlation between the equipment readings and NetAlly test traffic. Other tests check the availability and performance of higher level network services and protocols, such as electronic mail, Web, DNS, FTP and DHCP. The combination of emulated traffic tests and tests of services can be used to identify whether a problem is due to a network fault or to a server.

SUMMARY OF THE INVENTION

Embodiments of the present invention provide methods and systems for testing the implementation of Quality of Service policies in a network, and specifically for verifying that nodes in the network, such as routers, will forward high-priority packets ahead of low-priority packets under conditions of high network load, according to policies defined by a network manager. Such verification permits a network operator to ensure that the QoS required for transmission of realtime traffic, such as VoIP, is actually implemented and maintained by network elements and to detect configuration faults that may cause performance degradation under high-load conditions.

According to a disclosed embodiment of the invention, network testing is conducted using a pair of traffic agents that are disposed at sender and receiver endpoints in order to verify that a QoS policy involving traffic with high priority, such as VoIP traffic, is applied between the endpoints. The testing typically occurs during an early stage of a QoS evaluation process, and assures that the network behaves according to a recommended QoS policy before more detailed evaluation is conducted. In addition, the tests may assist in troubleshooting the root cause of low QoS standard indicators, e.g., low MOS values.

The sending traffic agent generates and transmits a stream of back-to-back packet batches, each batch being composed of back-to-back high and low priority packets having a predetermined sending order. The receiving traffic agent analyzes the arrival of the packets in the packet batches, and determining differences between the order of arrival relative to the sending order. The receiving traffic agent also analyzes inter-packet arrival timing and returns results to a traffic control module. Results are analyzed to classify the actual observed network QoS, and matched to governing policies in order to determine compliance. The tests are typically run periodically to evaluate the effects of other traffic concurrently transiting the network.

In some embodiments of the invention, delay and loss prioritization given to high-priority packets over low-priority data traffic are evaluated.

In some embodiments of the invention, maximal throughput of high priority packets is evaluated.

In some embodiments of the invention tests are conducted not between two traffic agents but between a traffic agent and other network devices over a limited length path. Here the packet batches are sent as described above, but the TTL field of the IP packets is set to a predetermined value. When the packet is transferred from an IP router to another IP router, the TTL field is decremented as specified by the IP protocol. When the TTL field reaches a value of 0, the router sends back (for each such packet in the batch) to the source an ICMP error message, termed a "destination unreachable" message, together with an appropriate error code. As all ICMP packets are sent at the same priority, no matter if a high or low priority packet caused the TTL error, all such ICMP responses are transmitted back to the source at the same priority. The source identifies which of its original packets corresponds to an ICMP destination unreachable response.

The invention provides a method of testing packet prioritization in a data network, which is carried out by transmitting a stream of data packets over the network from a sender toward a receiver. The stream is formed of a sequence of high priority packets and low priority packets in a predetermined sending order. The method is further carried out by receiving the stream at the receiver, determining a difference between the receiving order of packet arrival at the receiver of the high priority packets and the low priority packets in the stream relative to the sending order, and responsively to the difference, evaluating performance of the packet prioritization in the network.

In one aspect of the method, the difference in receiving order is measured by the number of overtakings of the low priority packets by the high priority packets.

In another aspect of the method, the difference in receiving order is measured by differences between respective times of arrival at the receiver of the low priority packets and the high priority packets.

According to a further aspect of the method, the high priority packets are RTP packets.

According to yet another aspect of the method, the low priority packets are TCP type packets created using a raw socket mechanism.

According to still another aspect of the method, the sequence is arranged in groups of packet batches, each of the groups having a predefined number of packet batches, the packet batches being transmitted successively with a predefined time separation therebetween.

According to one aspect of the method, the packet batches comprise a predefined sequence of the high priority packets and the low priority packets, in which all of the low priority packets precede any of the high priority packets.

Yet another aspect of the method transmitting includes receiving error messages from the receiver, and determining the receiving order of packet arrival at the receiver responsively to respective times of arrival of the error messages.

In still another aspect of the method transmitting includes assigning a common TTL value to a field of the high priority packets and a field of the low priority packets, and iteratively increasing the TTL value and retransmitting the stream using the increased TTL value until a predetermined number of error messages is received.

The invention provides a computer software product, including a computer-readable medium in which computer program instructions are stored, which instructions, when read by a computer, cause the computer to perform a method for testing packet prioritization in a data network, which is carried out by transmitting a stream of data packets over the network from a sender toward a receiver. The stream is formed of a sequence of high priority packets and low priority packets in a predetermined sending order. The method is further carried out by receiving the stream at the receiver, determining a difference between the receiving order of packet arrival at the receiver of the high priority packets and the low priority packets in the stream relative to the sending order, and responsively to the difference, evaluating performance of the packet prioritization in the network.

The invention provides an apparatus for testing packet prioritization in a data network, including a sending traffic agent and a receiving traffic agent, which are respectively coupled to a sender endpoint and a receiver endpoint of a path through the network. A testing center coupled to the receiving traffic agent and to the sending traffic agent is operative to instruct the sending traffic agent to transmit a stream of data packets to the receiving traffic agent. The stream is formed of a sequence of high priority packets and low priority packets in a predetermined sending order. The stream is received by the receiving traffic agent, which is operative for determining an order of packet arrival at the receiver endpoint of the high priority packets and the low priority packets in the stream, and for calculating responsively to the order of packet arrival a difference between a receiving order of packet arrival at the receiver endpoint of the high priority packets and of the low priority packets in the stream relative to the sending order. The difference represents a quality of the packet prioritization in the network.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

System Architecture

Figure 1:
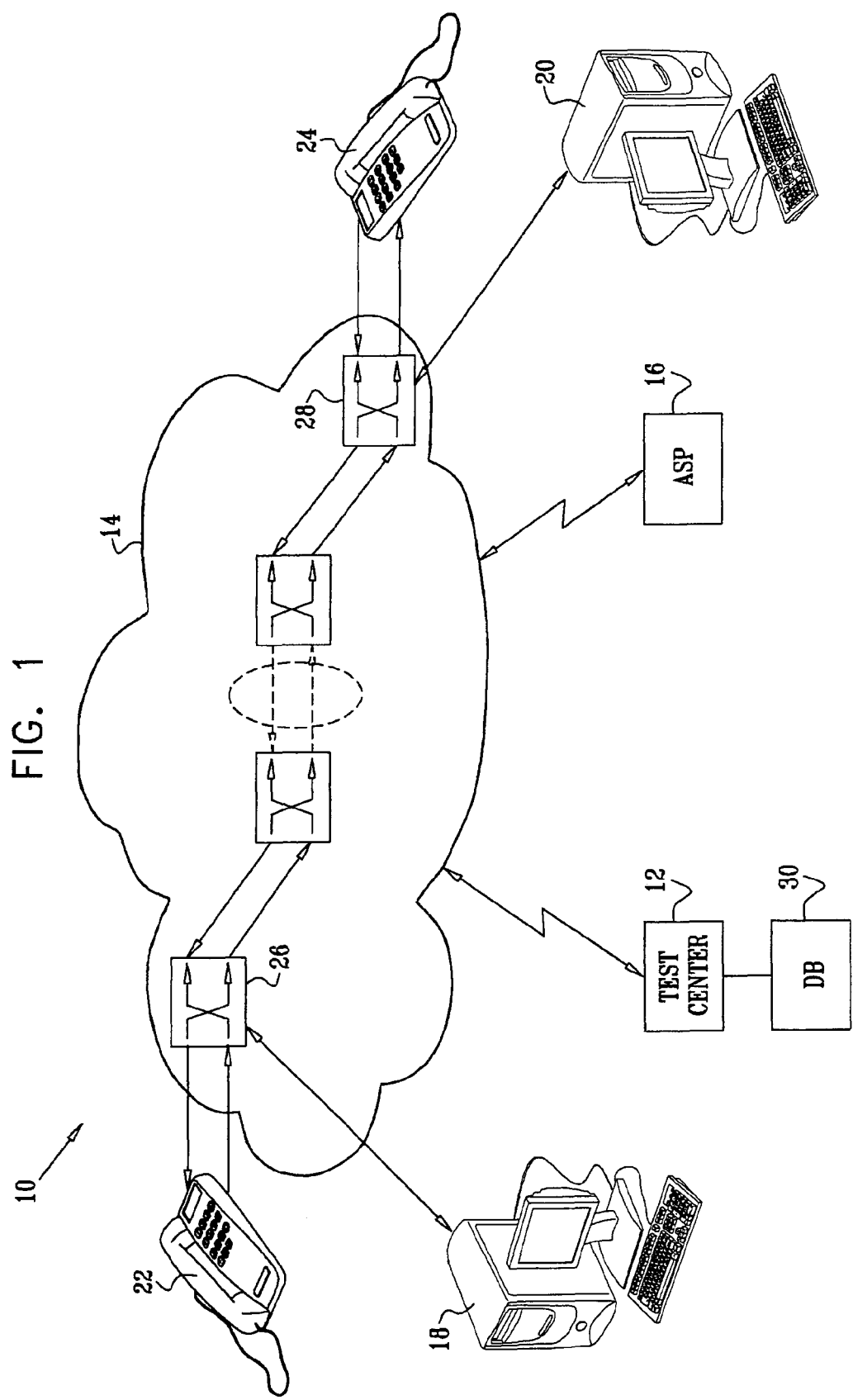
FIG. 1 is a block diagram of a network testing system that is constructed and operative in accordance with a disclosed embodiment of the invention.

Turning now to the drawings, reference is initially made to FIG. 1, which is a block diagram of a network testing system 10 that is constructed and operative in accordance with a disclosed embodiment of the invention. A test center 12 is responsible for conducting performance tests on a data network 14, which can be a private network, a service provider backbone network, the global Internet or a combination of the three. The test center 12 may be implemented by the owner of the data network 14 or be contracted from a management service provider 16 (MSP) that is responsible for the monitoring and management of the IP network of several establishments. The test center 12 provides diagnostic and troubleshooting services to the various network owners. The system 10 includes end-point traffic agents 18, 20. The traffic agents 18, 20 are coupled respectively to ports of switches 26, 28 at the end points of the path through the data network 14. Typically, the traffic agents 18, 20 serve as both traffic generators, transmitting packets through the network, and as traffic analyzers, receiving packets and assembling information regarding the received packets, as described in detail hereinbelow. In some embodiments, the traffic agents 18, 20 are implemented as software processes running on host computers or are embedded in the IP phones 22, 24 connected to the network. Some or all of the hosts may comprise add-on hardware devices to accommodate the needs of the traffic agents. Alternatively or additionally, the traffic agents 18, 20 may be implemented as stand-alone devices, independent of host computers.

The test center 12 typically conducts the tests that are described hereinbelow by transmitting appropriate commands to the traffic agents 18, 20. Subsequently, the testing center receives reports from the traffic agents 18, 20. The test center 12 processes the reports, evaluates the data network 14 based on the reports, and displays the test results to a network operator. The tests may be initiated by an operator, or they may be carried out automatically on schedule, or in response to a predetermined event.

The test center 12 maintains a central database 30, which includes the locations and addresses of all traffic agents running on end computers. These records are used in configuring tests of different types and in processing the test results. Information in the topology database may also includes a description of the network gear, including IP phones, VoIP PBX's, soft switches, routers, LAN switches, firewalls and border gateways. The database 30 likewise stores configuration parameters, test bundles, and other records of relevance to testing procedures and reports.

End to End QoS Testing

To facilitate understanding of the invention, it will be helpful to briefly discuss QoS protocols that may be used for VOIP and many other forms of data transmission in which packet prioritization is used. Network routers have the ability to prioritize traffic according to predefined parameters. This is typically accomplished using a queueing mechanism, which buffers, drops and dispatches packets according to a governing QoS policy. The router's QoS policy determines the order of packet transmission by assigning packets to different queues, and prioritizing the servicing of these queues.

In the cases of RTP VoIP traffic and other prioritized data transmission services, priority queuing may be implemented. In this QoS policy, packets belonging to one priority class of traffic are transmitted before all lower priority traffic. Strict priority queueing allows delay-sensitive data such as voice to be dequeued and sent before packets in other queues are dequeued. Alternatively, low latency queueing (LLQ), as applied in some Cisco routers, modifies strict priority queueing, allowing classes of traffic to be defined according to protocol, interface, or access lists. Characteristics can be assigned to the classes, e.g., priority, bandwidth, queue limit. For example, a strict priority queue can be band-width-limited so that a class cannot totally block the traffic of other classes. For purposes of priority queuing, it is convenient to classify VoIP traffic QoS classes by either: (1) protocol type, e.g., RTP and port range; or (2) DiffServ (DSCP) and IEEE 802.1p values.

Many other known queueing disciplines can be implemented in different applications. The following are examples:

First-in, first-out queueing (FIFO) entails no concept of priority or classes of traffic. With FIFO, transmission of packets out the interface occurs in the order the packets arrive.

Weighted fair queueing (WFQ) offers dynamic, fair queueing that divides bandwidth across queues of traffic based on weights. WFQ ensures that all traffic is treated fairly, given their weights, and attempts to ensure satisfactory response time for applications, such as interactive, transaction-based applications that are intolerant of performance degradation.

Class-based weighted fair queueing (CBWFQ) extends the WFQ discipline to provide support for user-defined traffic classes. Using CBWFQ, traffic classes are defined, based on selected criteria, e.g., protocols, access control lists, and input interfaces. Packets satisfying the match criteria for a class constitute the traffic for that class. A queue is reserved for each class, and traffic belonging to a class is directed to the queue for that class. Once a class has been defined according to its match criteria, it may be assigned characteristics, e.g., bandwidth, weight, maximum packet limit. The bandwidth assigned to a class is the guaranteed bandwidth delivered to the class during congestion. The queue limit for that class is the maximum number of packets allowed to accumulate in the queue for the class.

In custom queueing (CQ), bandwidth is allocated proportionally for each different class of traffic. CQ allows the number of bytes or packets to be drawn from the queue to be specified, which is especially useful on slow interfaces.

Whatever queue discipline is in force, the purpose of a QoS test is to verify that the governing QoS policy is being correctly applied between any two points in a network. In some aspects of the invention, the tests that are described below are typically used in a first stage of a realtime service (e.g., VOIP) evaluation process. They verify that the network behaves according to a recommended QoS policy before starting a more detailed evaluation in the network. In addition, the tests may assist troubleshooting when impaired service quality is experienced. The test packets are configured with the same QoS classification parameters as are currently being used for high and low priority traffic.

Network testing is conducted using a pair of traffic agents that act as sender and receiver endpoints. The sending traffic agent generates and transmits packet batches, each batch being composed of high and low priority packets having a known sending order and attached back-to-back. The transmission of packet batches in a predefined arrangement and sending order is sometimes referred to herein as a "stream", "packet stream", or a "stream of data packets".

Packets are grouped into batches that are composed of a predefined sequence of low priority packets and high priority packets. In one embodiment, all the low priority packets precede the high priority packets in a batch. Typically, packets are transmitted back-to-back. Optionally, packets may be separated by a constant time period T1. In some embodiments, batches can be constituted by a mixture packets having more than two priority classes.

Batches are sent in groups, each group having an integral number of batches sent back-to-back. Optionally, batches may be separated by a constant time period T2. In the current embodiments, the number of batches in a group is shown in Table 2, e.g., five batches in a group for a five Mbps path.

Each test involves the transmission of a predefined number of groups, each group being separated by a constant time period T3. A test run comprises at least a few hundred batches in order to obtain reliable statistics.

In one embodiment, all of the low priority packets in each batch precede any high priority packet in that batch. The receiving traffic agent analyzes the stream of data packets and returns results to a traffic control module. In particular, the receiving traffic agent evaluates the order of packet arrival relative to the sending order. Path speed and the priority classification of the traffic are parameters used to configure the tests. The tests are typically run periodically, under varying load conditions, to evaluate the effects of other traffic being concurrently transiting the network.

Embodiment 1

Figure 2:
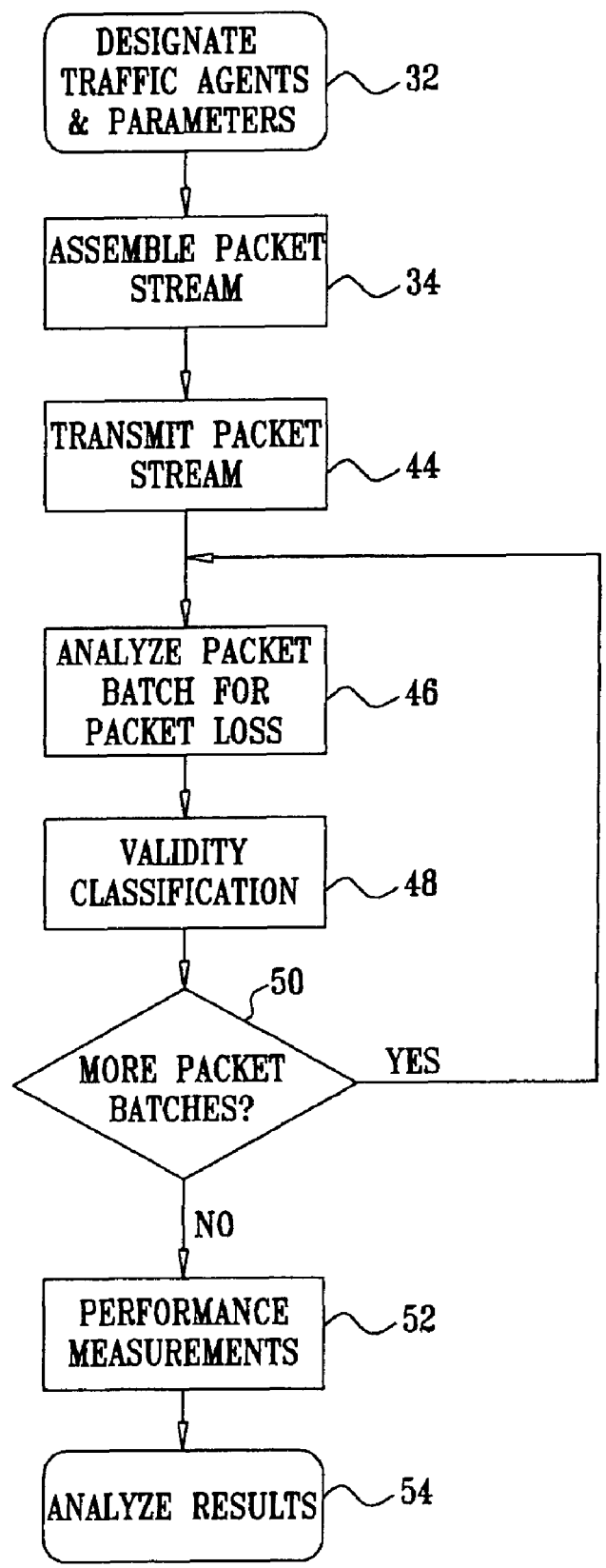
FIG. 2 is a flow chart illustrating a method of testing network performance in accordance with a disclosed embodiment of the invention.

Reference is now made to FIG. 2, which is a flow chart illustrating a method of testing network performance in accordance with a disclosed embodiment of the invention. At initial step 32, sending and receiving traffic agents are designated. Parameters and appropriate identifiers are chosen for high and low quality service identification. The topology of the network being tested often influences the positioning of the traffic agents. Other considerations, such as the distribution of traffic, may also play a role in this determination. It should be emphasized that many different end points can be selected for different test runs.

Next, at step 34 a stream of intermingled high priority packets and low priority packets is configured at the sending traffic agent, according to the parameters that were chosen in initial step 32. In one embodiment, the high-priority packets are of type RTP with configurable DiffServ DSCP and RTP ports. The low-priority packets are of type UDP or TCP with no IP priority bits set (DiffServ DSCP 0) and having a designated port (e.g., TCP port 21-FTP or UDP port 69-TFTP). It will be appreciated that these choices are exemplary. Many different types and combinations of high and low priority packets will occur to those skilled in the art.

Figure 3:
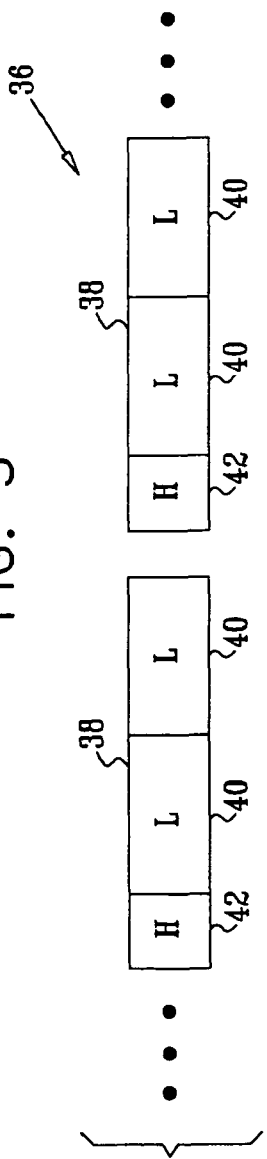
FIG. 3 schematically illustrates a packet stream that has been assembled in accordance with a disclosed embodiment of the invention.

Reference is now made to FIG. 3, which schematically illustrates a packet stream 36 hat has been assembled in step 34, in accordance with a disclosed embodiment of the invention. Packet batches 38 each are formed by a combination of packets sent as two large-payload low priority packets 40, followed by one high priority packet 42, which are generated and transmitted back-to-back, with no separation of the packets in terms of time. Based on chosen parameters, the packet batches 38 are replicated a predetermined number of times to form groups, as described above, based on the path speed factor, and sent in sequence to create the packet stream 36. Table 2 illustrates an exemplary composition of a packet stream, in which the number of packet batches 38 is shown in the right column. Table 2 also shows a typical payload size for the low priority packets 40.

The packet stream 36 is sent as individual packets, for example using raw sockets. Raw sockets are well-known in the art, and provide direct access to all aspects of data in a packet, including all IP header parameters. Using raw sockets, it is possible to inject low-priority packets by sending them marked as TCP type packets without establishing a TCP connection with any destination. Such packets appear to have been sent through a TCP connection even though the packet exchange for establishing such a connection has not been incurred. It will be understood that the number and order of packets comprising the packet batches 38 is arbitrary, and many combinations of high and low priority packets could be chosen for assembly into packet batches. It is only necessary that the order be known for purpose of subsequent analysis.

TABLE 2

| Line Speed | Low priority payload size (bytes) | # of batches in group |
|---|---|---|
| 512K | 512 | 1 |
| 1 M | 1K | 1 |
| 2 M | 1K | 2 |
| 5 M | 1K | 5 |
| 10 M | 1K | 10 |
| 100 M | 1K | 100 |

Referring again to FIG. 2, the method continues at step 44, where the packet stream that was assembled in step 34 is transmitted to the receiving traffic agent. Alternatively, in another embodiment of the invention, the tests are conducted not between two traffic agents, but between a traffic agent and other network devices over a limited length path.

Control now proceeds to step 46, where a packet batch is inspected at the receiving traffic agent. Additionally or alternatively, inspection of ICMP error packets can be made at the transmitter in order to determine if any packet loss occurred during the transmission at step 44. If packets have been lost, the current packet batch cannot be considered as fully valid. However, it may be sufficiently valid for performance of some calculations, which are described below.

Using the information acquired at step 46, control proceeds to step 48, where the current packet is further classified according to its level of validity, as defined hereinbelow. The order of packet arrival at the receiving traffic agent may be different from the order in which the packets were sent. The order of arrival depends on the queuing policy of the network routers en route, and the current density of network traffic. Armed with this knowledge, at the receiving traffic agent, the order of arrival of the packets in a packet batch is determined by examination of their respective timestamps. Continuing to refer to the example of FIG. 3, assume that the packets in a particular packet batch were received at times $t_{1L}$, $t_{2L}$ and $t_H$ (the reception times of the first low priority packet sent, the second low priority packet, and the high priority packet, respectively). The current packet batch is considered to be "fully valid" for calculation if all its packets were determined to have been received at step 46, and no out-of-order reception occurred among the low priority packets. The batch is considered "valid" for calculation if at least one of its low priority packets was received and no out-of-order reception occurred among the low priority packets. Otherwise, the batch is considered "invalid."

Control now proceeds to decision step 50, where it is determined if all packet batches of the current packet stream have been processed at the receiving traffic agent. If the determination at decision step 50 is negative, then control returns to step 46 where another packet batch is processed.

If the determination at decision step 50 is negative, then control proceeds to step 52, where QoS measurements are performed on the packet stream that was transmitted in step 44. The QoS measurements represent figures of merit that reflects network performance. Only valid and fully valid packet batches are considered in step 52. Invalid packet batches are disregarded. The calculation of the QoS measure for the packet stream depends on the number of fully valid packet batches that were received in the packet stream:

In a first alternative, used when many fully valid packet batches were received, the calculation is as follows:

$$T = \Sigma(t_{2Li} - t_{1Li})/N \qquad i \in N,$$

where N is the number of fully valid packet batches.

Then:

$$Q = \begin{cases} (t_{2L} + t_{1L} - 2t_H)/T & \text{for a fully valid batch} \\ (t_{jL} - t_H)/T \; j\varepsilon(1,2) & \text{for a valid batch} \end{cases}$$

It is clear that a positive Q value means that the high priority traffic overtakes the low priority traffic and that a large negative Q value indicates poor QoS. The division by T normalizes the results to be independent of path speed. This is desirable, as the values of the nominator and denominator of both terms grow linearly as the link speed decreases.

In a second alternative, when a relatively small number of fully valid packet batches were received, the value T is composed of too few packet pair samples to be statistically significant (a reasonable threshold is less than 100 valid packet batches out of 500 sent).

In order to overcome this problem and still have a good indication of the QoS configuration, one counts overtakings of a low priority packet by a high priority packet in a packet stream. When using the structure shown in FIG. 3, such an overtaking should occur at least once per packet batch. This number is divided by the total number of batches. Then, an average is calculated as follows.

$$Q = \left(\sum_{j=1}^{N} OV_j\right)/N$$

where j is the $j^{th}$ packet batch of a packet stream, and $OV_j$ is an indicator that takes the following values:
- the value 2 if a valid $j^{th}$ batch has two high priority packets preceding a low priority packet;
- the value 1 if a high priority packet of a valid $j^{th}$ batch overtakes a low priority packet;
- the value −1 if a low priority packet of a $j^{th}$ batch precedes all high priority packets of that batch; and
- the value 0 otherwise.

Control now proceeds to final step 54, where results are analyzed and reported. Two thresholds (high and low thresholds) are used for analyzing the Q value for both alternatives. A network is considered to support VOIP traffic if the Q value exceeds the high threshold, and to fail to support VOIP traffic if the Q value is below the low threshold. If the Q value falls between the thresholds, the test is inconclusive. Typical values for the high and low thresholds are 0.8 and 0, respectively.

EXAMPLE 1

At a line speed of 2M, the sending traffic agent sends four packet groups per second (250 ms spacing between the packet groups). As shown on the third data line of Table 3, each packet group is composed of two packet batches, each batch having three packets (2×3 packets=6 packets, back-to-back). This means that there are 16 low priority and eight high priority packets sent per second. The low priority payload is one Kbyte, and the low priority packet payload is about 20 bytes. The average transmission rate is below 150 Kbps, or less than 7.5% of the line capacity. The total number of packet batches is 600 in order to obtain a reliable statistical sample.

Figure 4:
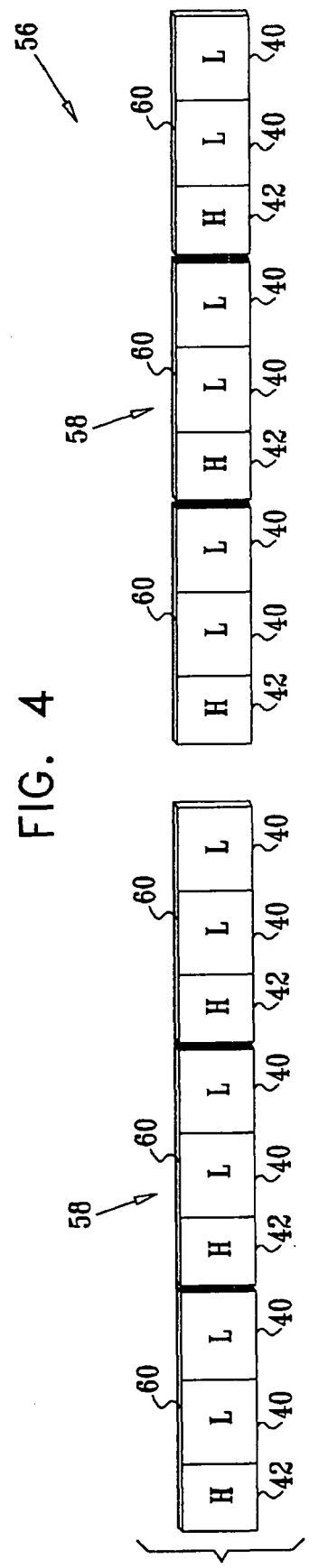
FIG. 4 illustrates the composition of another packet stream that has been assembled according to a disclosed embodiment of the invention and FIG. 5 is a flow chart illustrating a method of testing network performance in accordance with an alternate embodiment of the invention.

Reference is now made to FIG. 4, which illustrates the composition of another packet stream 56, according to a disclosed embodiment of the invention. Two representative packet groups 58 are shown, each comprising three packet batches 60. Each of the packet batches 60 has two low priority packets 40 and one high priority packet 42, arranged in the same manner as shown in FIG. 3. Similar examples for other line speeds are given in Table 3.

Optionally, configuration of the packet stream can be accomplished automatically by first measuring the available line speed and its capacity using "packet pair" or "packet train" methods. These are described, for example, in the documents, *A Control-Theoretic Approach to Flow Control*, Srinivasan Keshav, Proceedings of ACM SIGCOMM, Zürich, Switzerland, Sep. 1991, pp. 3-15, and *On the Comparison of Packet-Pair and Packet-Train Measurements*, Andreas Johnsson, Swedish National Computer Networking Workshop, Arlandastad, 2003, which are herein incorporated by reference.

TABLE 3

| Line Speed | Low priority payload (bytes) | Packets per Batch | Batches per packet group | Packet groups per sec | Ave. test rate (Kbps) | Sec | Total packets |
|---|---|---|---|---|---|---|---|
| 512K | 512 | 3 | 1 | 4 | 32 | 25 | 300 |
| 1 M | 1000 | 3 | 1 | 4 | 68 | 25 | 300 |
| 2 M | 1000 | 3 | 2 | 4 | 136 | 25 | 600 |
| 5 M | 1000 | 3 | 5 | 4 | 340 | 25 | 1500 |
| 10 M | 1000 | 3 | 10 | 4 | 680 | 25 | 3000 |
| 100 M | 1000 | 3 | 100 | 4 | 6800 | 25 | 30000 |

Embodiment 2

In this embodiment, the TTL field of the IP packets is set to a predetermined value L that determines the distance it can travel from the traffic agent. The TTL field is an 8-bit field that sets an upper limit on the number of routers (or network hops) through which a packet can pass. Its value describes the number of hops after which the packet is discarded. This field is initiated and set at the sender end to the predefined value L (32 or 64 for normal application traffic), and is decremented by one by every router through which the packet passes. When the value of the TTL field becomes either 1 or 0 (depending on routing behavior), then the datagram is thrown away by the network device and an error report is sent back to the sender. Specifically, once the packet has been discarded, the router sends an ICMP error message, "Time Exceeded" (type field 11) back to the sender. Using this method, when a router receives a datagram whose TTL field value is 1 or 0, then it does not forward the datagram.

As all ICMP error packets have the same priority, no matter if a high or low priority packets caused the TTL error, all ICMP responses are transmitted back to the source at the same priority. Moreover, as ICMP error messages include the first 64 bits of the original message that caused its transmission, the sender can identify which of its original packets is related to the particular ICMP message it receives. Consequently, for each value of L, the transmitter can conduct the same analysis that is described hereinbelow. The transmitter conducts this test using increasing values of L starting from 1. It ceases to increase the value of L once an ICMP error of the type "Time Exceeded" is not received back following multiple transmissions of a certain value, or in case an ICMP packet of type "Port Error" is reported. This behavior is similar to the well-known traceroute program. Indeed, many known variants of the traceroute program can be employed, mutatis mutandis, for carrying out the procedures described below.

Consider a case wherein two packets that originated from the same source reach a router in the network with an expired TTL field. The router discards both, and responds to each of them by returning individual ICMP error messages to the sender. Both ICMP error messages comprise very small packets and belong to the same priority class. Therefore, it is likely that the interval between the receptions of the two ICMP packets at the sender is similar to the interval between the arrival of the original packets at the router. If the original packets were to have different DiffServ values and were sent back-to-back from the origin, e.g., the low priority packet preceded the high priority packet, any discrimination among the original packets along the path to the particular router will be reflected in the timing and order of the reception of the corresponding ICMP error message at the source. The inventive method exploits this fact in order to analyze the handling of packets having different priorities by the network being analyzed.

Furthermore, when a UDP, RTP or TCP packet reaches its destination with a port number that is not open on that host a ICMP error message (type "Port Error") is sent back to the source. It is possible to provoke this error by intentionally associating an invalid port number with the packets being transmitted in the stream. This provides additional useful information, as described below.

Figure 5:
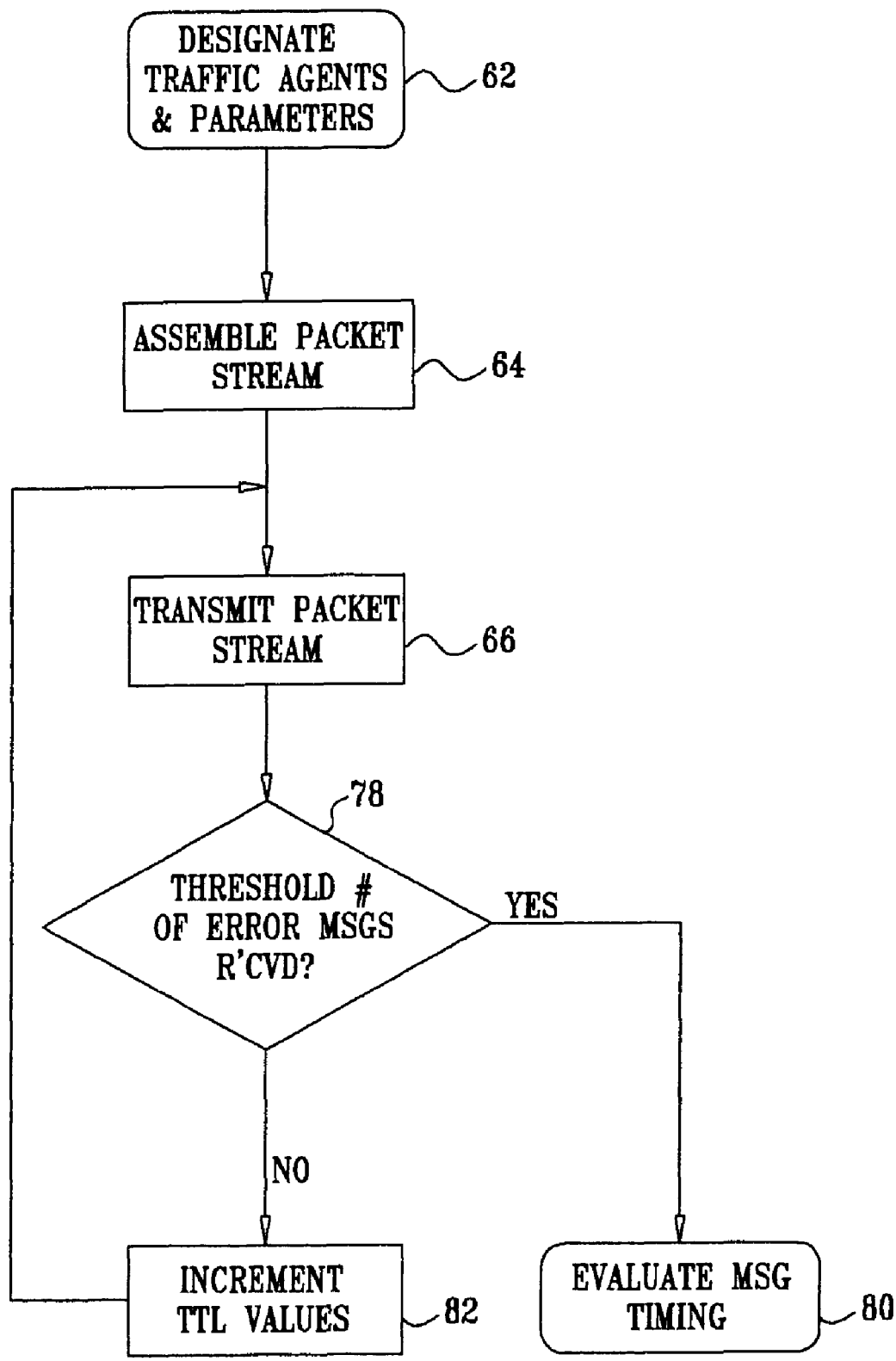

Reference is now made to FIG. 5, which is a flow chart illustrating a method of testing network performance in accordance with an alternate embodiment of the invention. At initial step 62, sending and receiving traffic agents are designated. This step is performed in the same manner as initial step 32 (FIG. 2).

Next, at step 64 a stream of intermingled high priority packets and low priority packets is configured at the sender, which as in Embodiment 1, can be a traffic agent or another network device. In the current version of this embodiment, the sender sends a group of packets, which is composed of multiple packet batches, wherein each packet batch is composed of two TCP packets followed by one RTP packet. However, many combinations of high and low priority packets of different types are possible, so long as the sending order is known. Each packet is assigned an initial TTL value in its TTL field, typically 1, which is further incremented each time the method is iterated. Each of the packets that are sent with the same TTL value is given a different identifier, which is included in the first eight bytes of the packet. As noted above, the identifiers enable the sender to associate the ICMP error messages that are returned with particular packets of the stream. Packets of the stream that are UDP, TCP or RTP packets may be assigned a port number, which is known to be invalid at the receiver.

The method continues at step 66, where the packet stream that was assembled in step 64 is transmitted to a designated receiver, which can be a traffic agent or another network device. ICMP error messages are expected, and when they arrive, the originating router is memorized.

Control now proceeds to decision step 78, where it is determined the procedure can be terminated. This decision is based on receipt of at least one ICMP error message of type "Port Error" for the current stream. Additionally or alternatively, the termination decision can be based on receipt of less than a statistically meaningful number (typically 100) of ICMP error messages of type "Time Exceeded" within a timeout period.

If the determination at decision step 78 is negative, then control proceeds to step 82. The TTL values of the packets of the current stream are incremented. Control returns to step 66 to transmit a new group of messages.

If the determination at decision step 78 is affirmative, then control proceeds to final step 80, where the time stamp of the ICMP error messages is evaluated and compared with the sending order of the corresponding packets. Generally, this evaluation is restricted to packet batches that have sufficient validity, using the procedure described above. Then, for each qualifying packet batch, if the sending order of the ICMP error messages is as expected, according to the QoS policy in force for the network, it is concluded that under the current conditions, the performance of the network complies with the QoS policy. Otherwise, it is concluded that the network does not comply with the QoS policy. In some applications, a global score may be compiled for the entire stream.

Implementation Details

Packet Reception

The packets on the receiver side can be captured in two ways: (1) Using OS sockets; and (2) Using a packet capture (Pcap) service, e.g., WinPcap, LibPcap, that captures the packets on the NIC driver level. The packet capture method is more accurate, since it captures the packets in a lower network level and it is used by default in the current embodiment. The first option is used if the network service cannot be initialized. WinPcap is an open source library for packet capture and network analysis under the Microsoft Windows® operating system, and is available, for example, at the URL "http://winpcap.polito.it/". LibPcap is a packet capture program that is available at the URL "http://ee.lbl.gov/".

Test Designation Parameters.

Test designation parameters are illustrated by Table 4.

TABLE 4

| Parameter | Description | Default value |
|---|---|---|
| Sending Traffic Agents | TA(s) (Name, IP, Port) - Sender Traffic Agent that generate the packet's stream. | None. |
| Receiving Traffic Agents | TA(s) (Name, IP, Port) -Receiver Traffic Agent that receives the stream, analyze it and return results. | None. |

TABLE 4-continued

| Parameter | Description | Default value |
|---|---|---|
| Line speed | Enumerated parameter represents the line speed. (speed ½ to 10) Possible parameters: 512K 1 M 2 M 5 M 10 M 100 M | 1 M |
| High QoS traffic identifier | Identifier of high QoS traffic in the network. Possible parameters: QoS IP bits Ports Range | QoS IP bits: Diffserv (46) |
| Low QoS traffic identifier | Identifier of low QoS traffic in the network. Possible parameters: UDP/port TCP/port | Port Range: 4000-6000 UDP/0 |
| Codec type | The codec type of the high quality RTP packets. | G729 |
| Packet Latency Tolerance | Maximum estimated Network delay (minimal value 0) in mSec. (Used for internal test parameters, such as calculating the length of the test, the time out parameter). | 3000 mSec |

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method of testing packet prioritization in a data network, comprising:
   transmitting stream of packet batches over said network from a sender to a receiver,
   wherein each packet batch contains high and low priority packets having a predetermined sending order;
   receiving said stream of packet batches at said receiver;
   for each packet batch at said receiver, determining a difference between a receiving order of packet arrival at said receiver of said high priority packets and said low priority packets relative to said predetermined sending order by measuring respective times of arrival at said receiver of said low priority data packets and said high priority data packets;
   classifying each packet batch at said receiver as:
      a fully valid batch if all packets are received and all low priority packets thereof are received in the predetermined sending order;
      a valid batch if at least one low priority packet but not all low priority packets thereof are received and all received low priority packets are in the predetermined sending order; and
      an invalid batch otherwise;
   computing a numerical value according to a predetermined function of said respective times of arrival at said receiver of said low priority data packets and said high priority data packets according to the fully valid batches and the valid batches thereof;
   comparing said numerical value to a lower predetermined numerical threshold and an upper predetermined numerical threshold; and
   determining a performance of said packet prioritization according to a result of said comparing, wherein:
      if said numerical value is above said upper predetermined numerical threshold, then determining that the network supports high-quality realtime traffic;
      if said numerical value is below said lower predetermined numerical threshold, then determining that the network fails to support high-quality realtime traffic;
      and determining that said testing is inconclusive otherwise.

2. The method according to claim 1, wherein said high priority packets are Realtime Protocol (RTP) packets.

3. The method according to claim 1, wherein said low priority packets are Transmission Control Protocol (TCP) type packets created using a raw socket mechanism.

4. The method according to claim 1, wherein said stream of packet batches is arranged in groups, each of said groups having a predefined number of said packet batches, said packet batches being transmitted successively with a predetermined time separation therebetween.

5. The method according to claim 4, wherein said packet batches each have a predefined sequence of said high priority packets and said low priority packets, at least some of said low priority packets preceding any of said high priority packets.

6. The method according to claim 1, wherein the transmitting comprises:
   receiving error messages from said receiver; and
   determining said receiving order of packet arrival at said receiver responsively to respective times of arrival of said error messages.

7. The method according to claim 6, wherein said step of transmitting further comprises assigning a common Time To Live (TTL) value to a field of said high priority packets and a field of said low priority packets, and iteratively increasing said TTL value and repeating said step of transmitting using said increased TTL value.

8. The method of claim 1, wherein said predetermined function is a function of a count of high priority packets overtaking low priority packets.

9. The method of claim 1, wherein said predetermined function is a function of reception times of high priority packets and low priority packets.

10. A computer software product comprising a computer-readable medium in which computer program instructions are stored, said computer readable medium selected from a group consisting of magnetic storage devices, optical storage devices, hardware components and combinations thereof, which instructions, when read by a computer, cause the computer to perform a method for testing packet prioritization in a data network, including:
   transmitting a stream of packet batches over the network from a sender to a receiver, wherein each packet batch contains high and low priority packets having a predetermined sending order;
   receiving said stream of packet batches at said receiver;
   for each packet batch at said receiver, determining a difference between a receiving order of packet arrival at said receiver of said high priority packets and said low priority packets relative to said sending order by measuring respective times of arrival at said receiver of said low priority data packets and said high priority data packets;

classifying each packet batch at said receiver as:
   a fully valid batch if all packets are received and all low priority packets thereof are received in the predetermined sending order;
   a valid batch if at least one low priority packet but not all low priority packets thereof are received and all received low priority packets are in the predetermined sending order; and
   an invalid batch otherwise;
computing a numerical value according to a predetermined function of said respective times of arrival at said receiver of said low priority data packets and said high priority data packets according to the fully valid batches and the valid batches thereof; comparing said numerical value to a lower predetermined numerical threshold; and an upper predetermined numerical threshold; and determining a performance of said packet prioritization according to a result of said comparing, wherein:
   if said numerical value is above said upper predetermined numerical threshold, then determining that the network supports high-quality realtime traffic;
   if said numerical value is below said lower predetermined numerical threshold, then determining that the network fails to support high-quality realtime traffic;
   and determining that said testing is inconclusive otherwise.

11. The computer software product according to claim 10, wherein said stream of packet batches is arranged in groups, each of said groups having a predefined number of said packet batches, said packet batches being transmitted successively with a predetermined time separation therebetween.

12. The computer software product according to claim 11, wherein said packet batches each have a predefined sequence of said high priority packets and said low priority packets, at least some of said low priority packets preceding any of said high priority packets.

13. The computer software product according to claim 11, wherein the transmitting comprises:
   receiving error messages from said receiver; and
   determining said receiving order of packet arrival at said receiver responsively to respective times of arrival of said error messages.

14. The computer software product according to claim 13, wherein said step of transmitting further comprises assigning a common Time To Live (TTL) value to a field of said high priority packets and a field of said low priority packets, and iteratively increasing said TTL value and repeating said step of transmitting using said increased TTL value.

15. An apparatus for testing packet prioritization in a data network, comprising:
   a sending traffic agent and a receiving traffic agent, which are respectively coupled to a sender endpoint and a receiver endpoint of a path through the network; and
   a testing center coupled to said receiving traffic agent and to said sending traffic agent,
     said testing center configured for instructing said sending traffic agent to transmit stream of packet batches to said receiving traffic agent,
     said stream of packet batches being received by said receiving traffic agent, and
     said receiving traffic agent configured for:
       for each packet batch received at said receiving traffic agent determining an order of packet arrival of said high priority packets and said low priority packets by measuring respective times of arrival at said receiving traffic agent of said low priority data packets and said high priority data packets;
       classifying each packet batch at said receiver as:
         a fully valid batch if all packets are received and all low priority packets thereof are received in the predetermined sending order;
         a valid batch if at least one low priority packet but not all low priority packets thereof are received and all received low priority packets are in the predetermined sending order; and
         an invalid batch otherwise;
       computing a numerical value according to a predetermined function of said respective times of arrival at said receiver of said low priority data packets and said high priority data packets according to the fully valid batches and the valid batches thereof;
       comparing said numerical value to a lower predetermined numerical threshold and an upper predetermined numerical threshold; and
       determining a performance of said packet prioritization according to a result of said comparing, wherein:
         if said numerical value is above said upper predetermined numerical threshold, then determining that the network supports high-quality realtime traffic;
         if said numerical value is below said lower predetermined numerical threshold, then determining that the network fails to support high-quality realtime traffic; and determining that said testing is inconclusive otherwise.

16. The apparatus according to claim 15, wherein said stream of packet batches is arranged in groups, each of said groups having a predefined number of said packet batches, said packet batches being transmitted successively with a predetermined time separation therebetween.

17. The apparatus according to claim 16, wherein said packet batches each have a predefined sequence of said high priority packets and said low priority packets, at least some of said low priority packets preceding any of said high priority packets.

18. The apparatus according to claim 15, wherein said sending traffic agent is operative for receiving error messages from a receiver; and
   determining said receiving order of packet arrival at said receiver responsively to respective times of arrival of said error messages.

19. The apparatus according to claim 18, wherein said sending traffic agent is operative for assigning a common Time To Live (TTL) value to a field of said high priority packets and a field of said low priority packets, and iteratively increasing said TTL value and executing retransmissions of said stream using a respective said increased TTL value.

* * * * *